(12) United States Patent
Cheong et al.

(10) Patent No.: US 7,916,371 B2
(45) Date of Patent: Mar. 29, 2011

(54) ACTUATOR FOR HOLOGRAPHIC INFORMATION STORING APPARATUS

(75) Inventors: Young-min Cheong, Seoul (KR);
Kyoung-woo Lee, Gunpo-si (KR);
Jae-hwan Kwon, Seoul (KR);
Hyoung-jong So, Ansan-si (KR);
Hong-hee Kim, Incheon Metropolitan (KR)

(73) Assignees: Samsung Electronics Co., Ltd.,
Suwon-si (KR); Kyungwon Ferrite Ind. Co., Ltd., Siheung-si (KR)

( * ) Notice: Subject to any disclaimer, the term of this patent is extended or adjusted under 35 U.S.C. 154(b) by 58 days.

(21) Appl. No.: 12/391,569

(22) Filed: Feb. 24, 2009

(65) Prior Publication Data

US 2009/0323150 A1 Dec. 31, 2009

(51) Int. Cl.
*G02B 26/08* (2006.01)
(52) U.S. Cl. .................................. 359/198.1; 359/224.1
(58) Field of Classification Search .... 359/223.1–226.1, 359/290, 291, 871, 872
See application file for complete search history.

(56) References Cited

U.S. PATENT DOCUMENTS

| | | | |
|---|---|---|---|
| 6,533,947 B2 * | 3/2003 | Nasiri et al. | 216/2 |
| 6,781,731 B2 | 8/2004 | Choi | |
| 7,190,854 B1 | 3/2007 | Novotny et al. | |
| 2002/0181843 A1 | 12/2002 | Vaganov | |
| 2004/0070813 A1 | 4/2004 | Aubuchon | |
| 2005/0253055 A1 | 11/2005 | Sprague et al. | |
| 2007/0063619 A1 | 3/2007 | Dewa et al. | |

FOREIGN PATENT DOCUMENTS

| | | |
|---|---|---|
| JP | 2002-260267 | 9/2002 |
| JP | 2006-113437 | 4/2006 |
| KR | 2002-0070590 | 9/2002 |
| WO | WO 2005/078506 | 8/2005 |

OTHER PUBLICATIONS

Office Action issued Sep. 24, 2009, in corresponding Korean Patent Application No. 10-2008-0062869.
European Search Report issued on Sep. 24, 2009, in corresponding European Application No. 09156183.7 (7 pages).
Korean Office Action issued on Mar. 19, 2010, in corresponding Korean Application No. 10-2008-0062869 (4 pages).

* cited by examiner

*Primary Examiner* — Euncha P Cherry
(74) *Attorney, Agent, or Firm* — NSIP Law

(57) ABSTRACT

An actuator to drive a mirror of a holographic information storing apparatus, the actuator including: piezoelectric cells; support members mounted on the piezoelectric cells; a hinge member mounted on the support member; and a post mounted on the hinge member, to support the mirror. The hinge member includes a bar disposed parallel to a rotation axis of the mirror, and a curved portion that extends from the bar.

15 Claims, 9 Drawing Sheets

… … …

ACTUATOR FOR HOLOGRAPHIC INFORMATION STORING APPARATUS

CROSS-REFERENCE TO RELATED PATENT APPLICATION

This application claims the benefit of Korean Patent Application No. 2008-62869, filed on Jun. 30, 2008, in the Korean Intellectual Property Office, the disclosure of which is incorporated herein by reference.

BACKGROUND OF THE INVENTION

1. Field of the Invention

Aspects of the present invention relate to an actuator for a holographic information storing apparatus.

2. Description of the Related Art

Holographic information storing technologies have been focused on in recent times. Holographic information storing methods use holograms to store information in polymer materials, or in materials comprising mineral crystals, which are sensitive to light that forms of an optical interference pattern. The optical interference pattern is formed by using two coherent laser beams. The optical interference pattern formed by interference between a reference laser beam and signal laser beam that may have difference phases. The interference pattern causes a chemical or physical change in a light-sensitive storage medium and is thereby recorded in the storage medium. To reproduce information from the recorded interference pattern, the reference laser is radiated onto the light sensitive storage medium and diffracts off of the interference pattern, so that the signal light can be reconstructed to reproduce the recorded information.

Such holographic information storage technologies include volume holography methods that record and reproduce information in a page unit, by using volume holography, and micro-holography methods that record and reproduce information in single bits, by using micro-holography. Although volume holography methods simultaneously process large amounts of information, since an associated optical system needs to be very precisely adjusted, it is difficult for the optical system to be used by general consumers, as an information storing apparatus.

Micro-holography methods form a precise interference pattern, by interfering two concentrated light beams at a focus point, to form interference patterns in a recording layer, along a plane of a storage medium. The recording layers are scanned in a depth direction of the storage medium, thereby three-dimensionally recording information on the storage medium.

In holographic information storing apparatuses, it is very important to precisely control the angle of incidence of the reference laser and the signal laser, with regard to holographic media. In general, holographic information storing apparatuses use a Galvano mirror, which are generally too large to be used in a small-sized optical head. When holographic information storing apparatuses uses a micro-electro-mechanical system (MEMS) mirror, the MEMS mirror uses an electrostatic force to provide a small driving force, and thus, its has limited resonance driving frequencies, a limited range of applications, and low precision.

SUMMARY OF THE INVENTION

Aspects of the present invention provide an actuator for a holographic information storing apparatus that is precisely controllable and suitable for a small-sized optical head.

According to an aspect of the present invention, there is provided an actuator to drive a mirror of a holographic information storing apparatus, the actuator comprising: a plurality of piezoelectric cells that vary in length according to an applied voltage; a plurality of support members mounted on the plurality of piezoelectric cells; a hinge member comprising a bar that is parallel to a rotation axis of the mirror and a curved portion extending from the bar; and a post mounted between the hinge member and the mirror.

According to aspects of the present invention, the hinge member may comprise: a plurality of first plates coupled to the plurality of support members; and a second plate on which the post is mounted. The bar and the curved portion are disposed between the plurality of first plates and the second plate.

According to aspects of the present invention, the curved portion may comprise: at least one first part that is parallel to the rotation axis of the mirror; and at least one second part that is perpendicular to the mirror.

According to aspects of the present invention, the plurality of piezoelectric cells may be connected at a bottom surface thereof.

According to aspects of the present invention, a plurality of connectors may be disposed between the adjacent support members. The plurality of support members may comprise a plurality of grooves to support the plurality of first plates.

According to aspects of the present invention, the thickness of the hinge member may be less than that of the plurality of support members.

According to aspects of the present invention, a space in which the hinge member moves may be formed between the plurality of support members.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
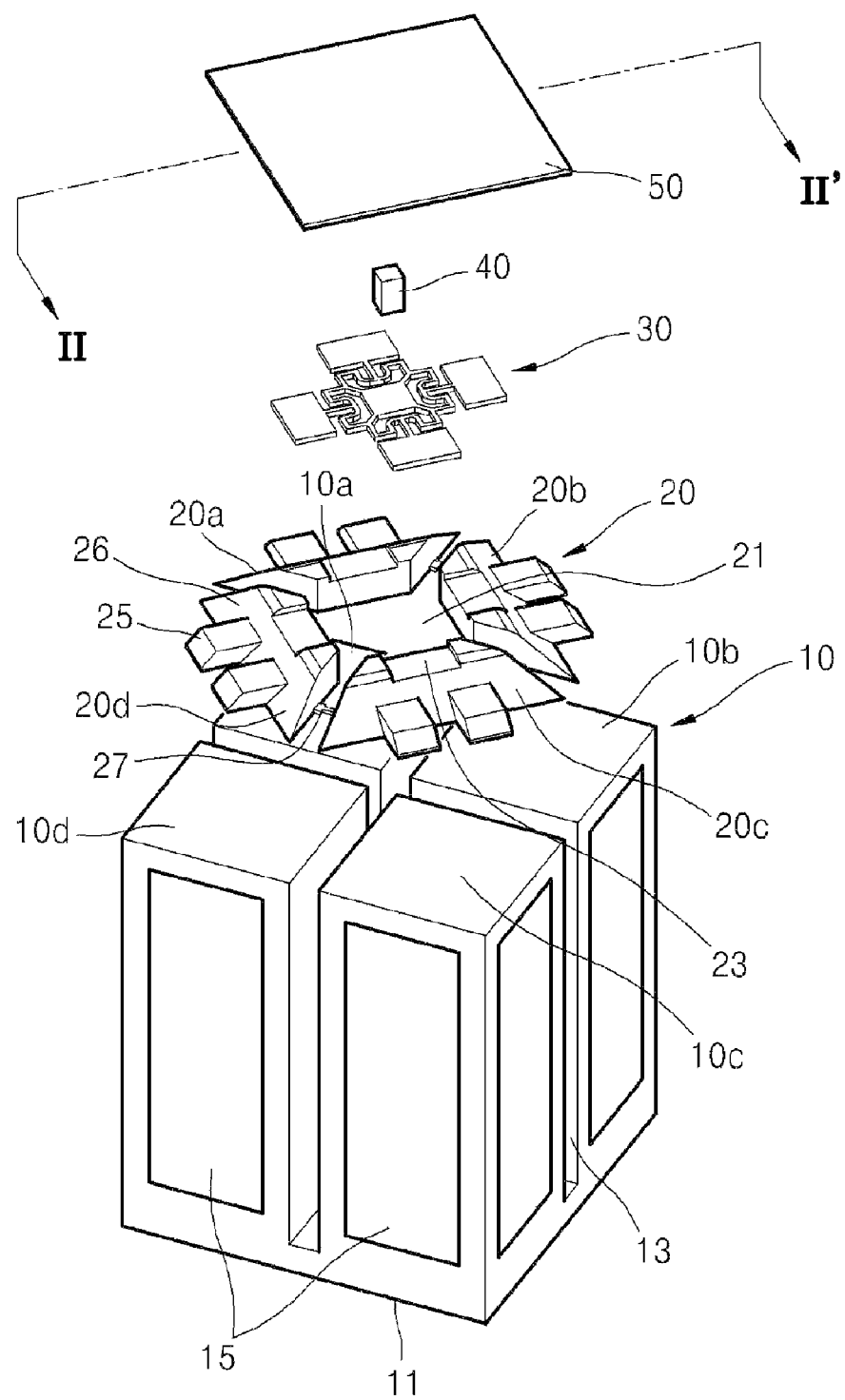
FIG. 1 is an exploded perspective view of an actuator, according to an exemplary embodiment of the present invention.

Reference will now be made in detail to the exemplary embodiments of the present invention, which are illustrated in the accompanying drawings, wherein like reference numerals refer to the like elements throughout. The exemplary embodiments are described below, in order to explain the aspects of the present invention, by referring to the figures.

According to aspects of the present invention, provided is an actuator that drives a mirror 50 of a holographic information storing apparatus. The actuator includes a piezoelectric element for precise driving. FIG. 1 is an exploded perspective view of the actuator.

The actuator comprises a piezoelectric member 10, a support 20 disposed on the plurality of piezoelectric member 10, a hinge member (hinge) 30 mounted on the support 20, and a post 40 to mount the mirror 50 to the hinge member 30. The piezoelectric member 10 generates a mechanical displacement, according to an input voltage. The piezoelectric member 10 includes first through fourth piezoelectric cells 10a, 10b, 10c, and 10d. The first through fourth piezoelectric cells 10a-10d are separated into respective bodies, by a predetermined gap 13, and are connected by a bottom surface 11. The first through fourth piezoelectric cells 10a-10d are stably fixed by the bottom surface 11. Four electrodes 15 are disposed on side surfaces of the first through fourth piezoelectric cells 10a-10d. The first through fourth piezoelectric cells 10a-10d are disposed in a 2×2 matrix and are separated by the predetermined gap 13.

The support 20 supports the hinge member 30 and is disposed on the first through fourth piezoelectric cells 10a-10d. The support 20 may comprise first through fourth support members 20a, 20b, 20c, and 20d, which can be separated from each other, or can be connected by a plurality of connectors 27 disposed between adjacent support members 20a-20d. The connectors 27 are formed of an elastic material, so as to allow the support members 20a-20d to move. The support members 20a-20d include grooves 23 on the top surfaces thereof, projecting portions 25 projecting from side surfaces 26 thereof. The side surfaces 26 may be inclined. Each of the support members 20a-20d may have two projecting portions 25. The projecting portions 25 prevent the mirror 50 from contacting the piezoelectric cells 10 when the mirror 50 rotates. An epoxy is coated between the projecting portions 25, so as to attach the support members 20a-20d to the piezoelectric cells 10.

Figure 2:
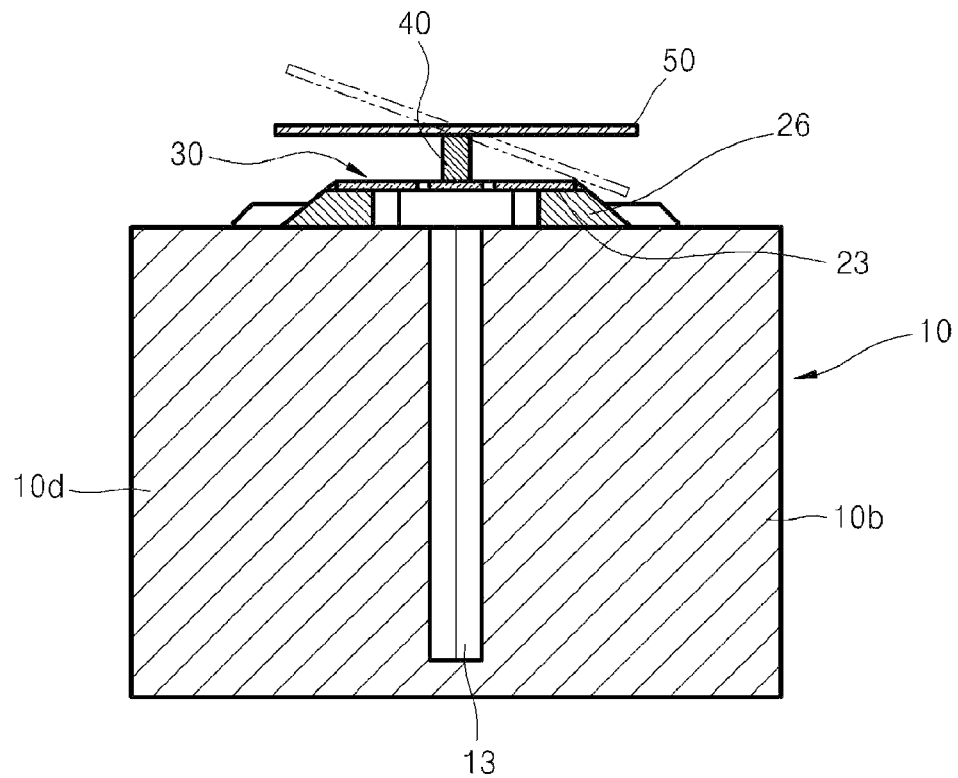
FIG. 2 is a cross-sectional view of the actuator, taken along line II-II' of FIG. 1.

An empty space 21 is formed between the support members 20a-20d, so that the hinge member 30 can move therein. Referring to FIG. 2, which is a cross-sectional view of the actuator taken along line II-II' of FIG. 1, the support members 20a-20d are thicker than the hinge member 30. Ends of the hinge member 30 are supported by the grooves 23, such that the hinge member 30 sits above the space 21. The post 40 is mounted on the top surface of the hinge member 30 and supports the mirror 50.

Figure 3:
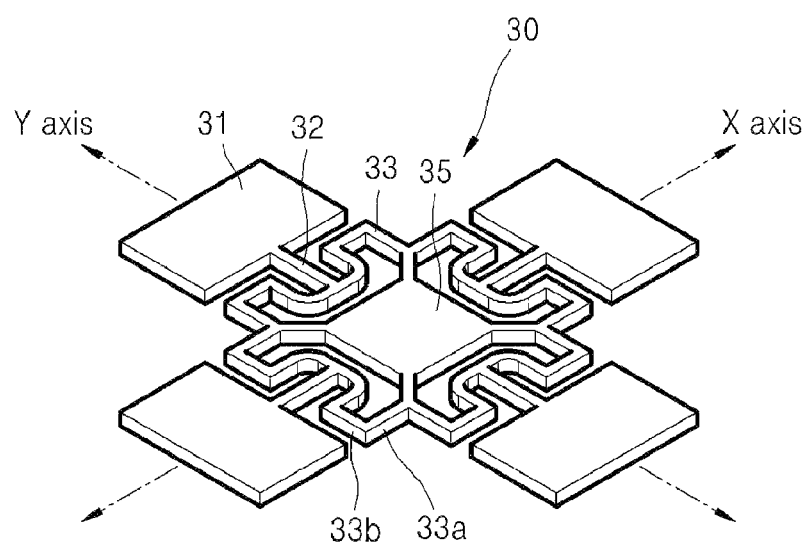
FIG. 3 is an enlarged perspective view of a hinge member.

FIG. 3 is an enlarged perspective view of the hinge member 30. Referring to FIG. 3, the hinge member 30 comprises bars 32 that are parallel to rotation axes (X axis and Y axis) of the mirror 50, and curved portions 33 that extend from the bars 32. Each curved portion 33 comprises at least one first part 33a, which extends from the end of the bar 32 and curves to finally extend back in a direction parallel to the rotation axis of the mirror 50. The curved portion 33 includes at least one second part 33b that extends from an end of the first part 33a, in a direction perpendicular to the rotation axis of the mirror 50 and is then bent and connected to a second plate 35. The first part 33a is approximately parallel to the rotation axis of the micromirror 50 and is twisted when the micromirror is rotated. The second part 33b is approximately perpendicular to the rotation axis of the mirror 50 and is bent when the micromirror is rotated. The first and second parts 33a and 33b contract and expand, when the hinge member 30 moves to disperse stress, so that a precise control is possible.

The hinge member 30 comprises a plurality of first plates 31 that are coupled to the grooves 23 and the second plate (central plate) 35, which is connected to the post 40 and the curved portions 33. Although increasing the number of the first and second parts 33a and 33b allows the curved portion 33 to better accommodate stress, the number of the first and second parts 33a and 33b is generally minimized, so as to realize a small-sized actuator. The mirror 50 rotates according to the motion of the hinge member 30. The mirror 50 can rotate along the X axis and/or the Y axis.

Figure 4A:
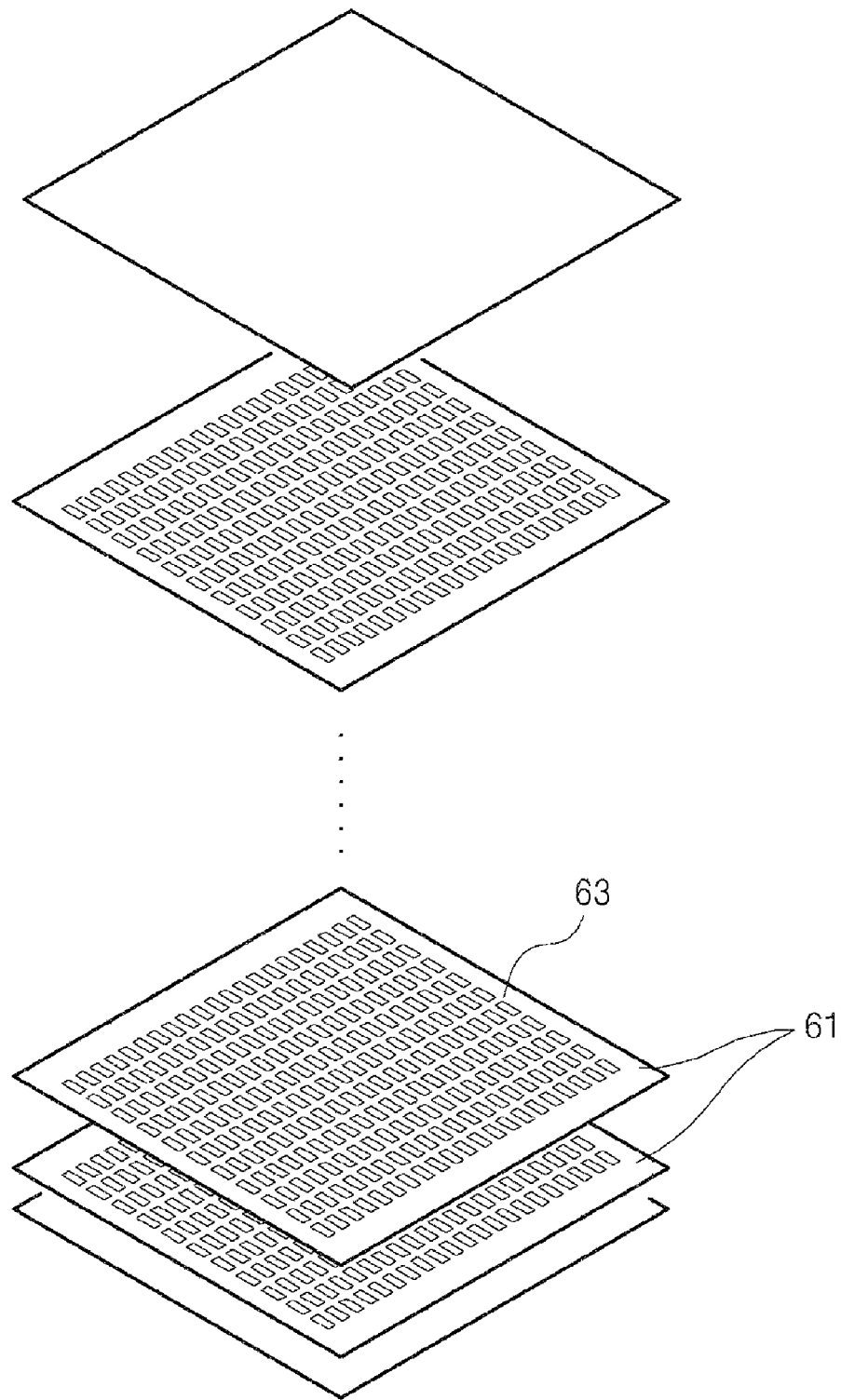
FIGS. 4A-4D are diagrams of a method of manufacturing a piezoelectric cell, according to an exemplary embodiment of the present invention.
Figure 4B:
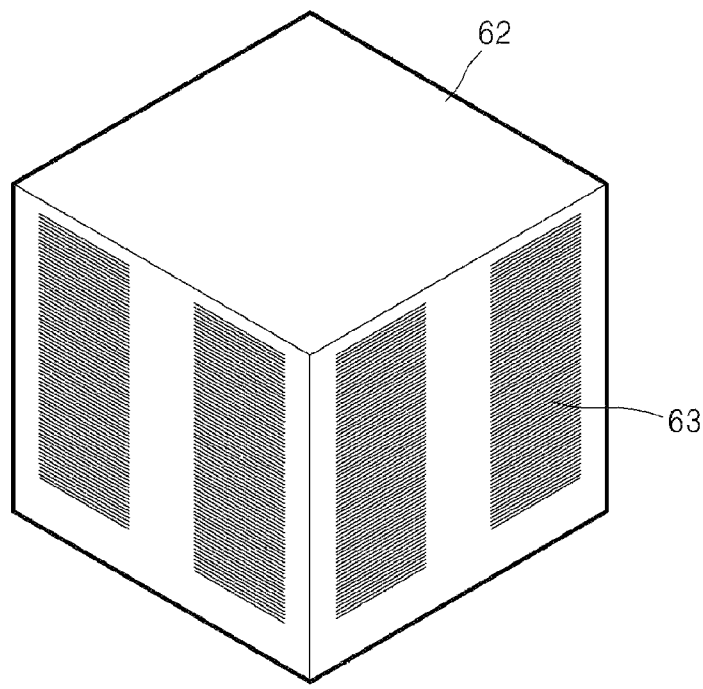

FIGS. 4A-4D are diagrams of a method of manufacturing a piezoelectric cell, according to an exemplary embodiment of the present invention. Referring to FIG. 4A, a plurality of molding sheets 61 are prepared. Internal electrode layers 63 are alternately stacked on the molding sheets 61 and pressurized by applying heat and pressure, thereby forming a stack body 62 as shown in FIG. 4B.

Figure 4C:
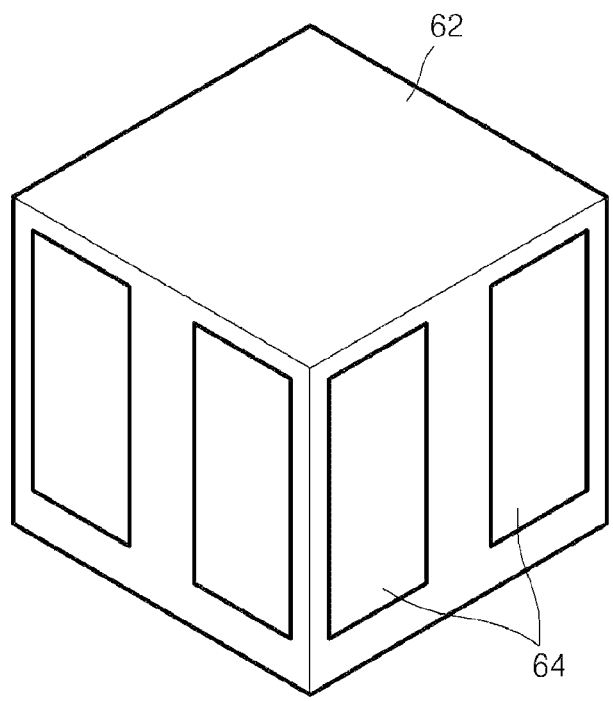
Figure 4D:
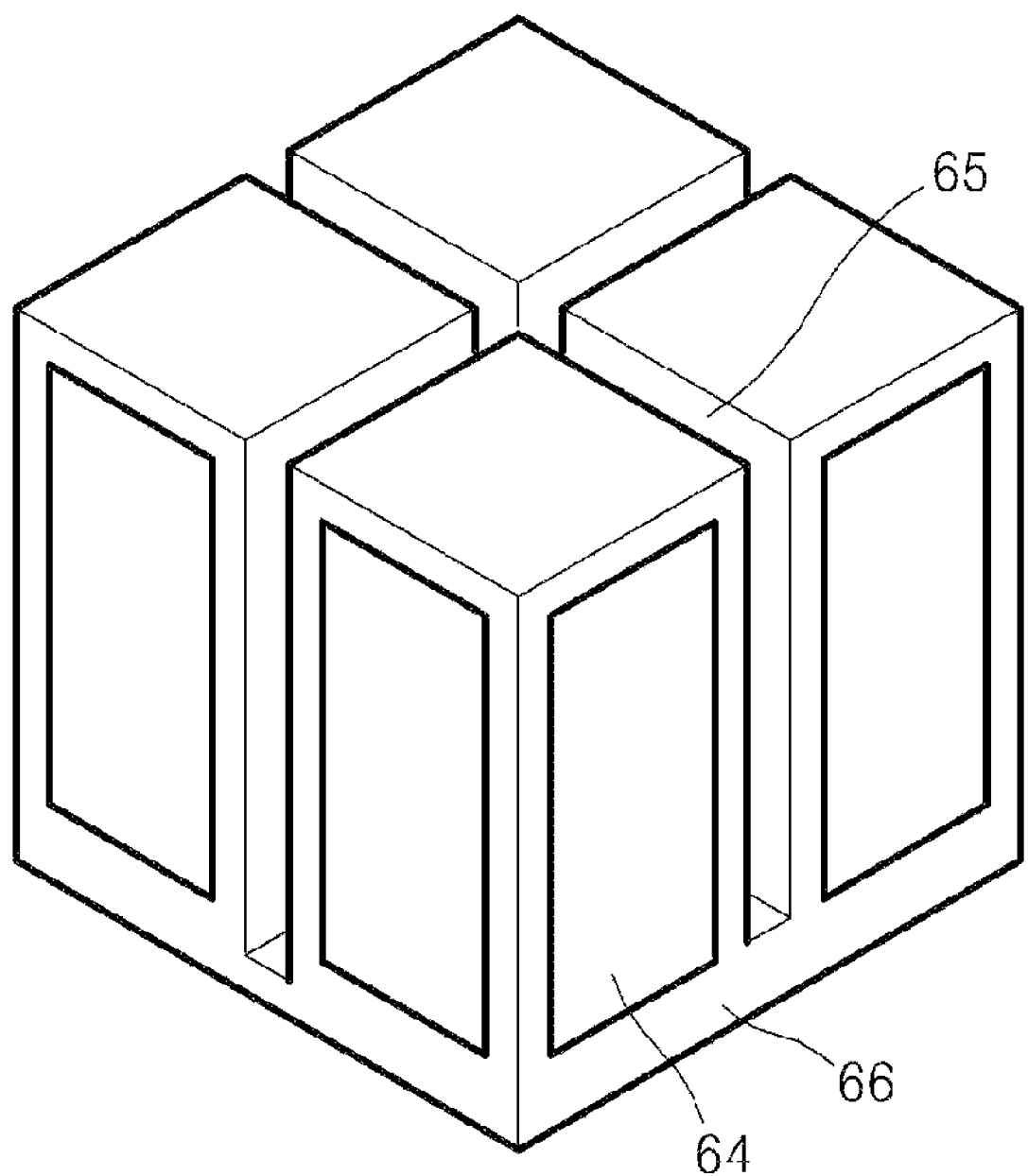

Referring to FIG. 4C, electrodes 64 are formed by coating the exposed internal electrode layers 63, with the conductive paste. Referring to FIG. 4D, the stack body 62 is divided into 4 cells, using a dicing method or a saw cutting method, to form a gap 65. A bottom part 66 of the stack body 62 is not cut, and the gap 65 is thereby consistently maintained between the 4 cells. The cut stack body 62 can be optionally polished with a ceramic material, so as to insure constant dimensions.

The operation of the actuator of the present exemplary embodiment will now be described with reference to FIG. 2. Referring to FIG. 2, if voltage is selectively applied to the first through fourth piezoelectric cells 10a-10d, the first through fourth piezoelectric cells 10a-10d contract or expand, according to the voltage, resulting in a change in the lengths of the first through fourth piezoelectric cells 10a-10d. The contraction/expansion changes the relative positions of the support members 20a-20d, and thus, changes the orientation of the hinge member 30. This changes the angle of the mirror 50, which is supported by the hinge member 30, via the post 40. The mirror 50 is supported by the post 40, so as to implement a precise control, by providing a rotation space for the mirror 50 and the movement of the hinge member 30.

Figure 5A:
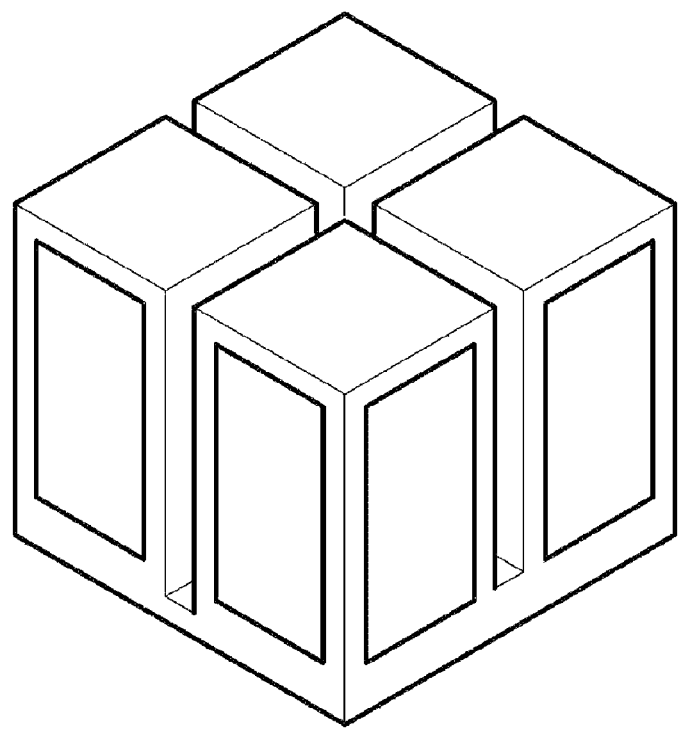
FIGS. 5A-5D are diagrams of the operation of the actuator, according to an exemplary embodiment of the present invention.
Figure 5A:
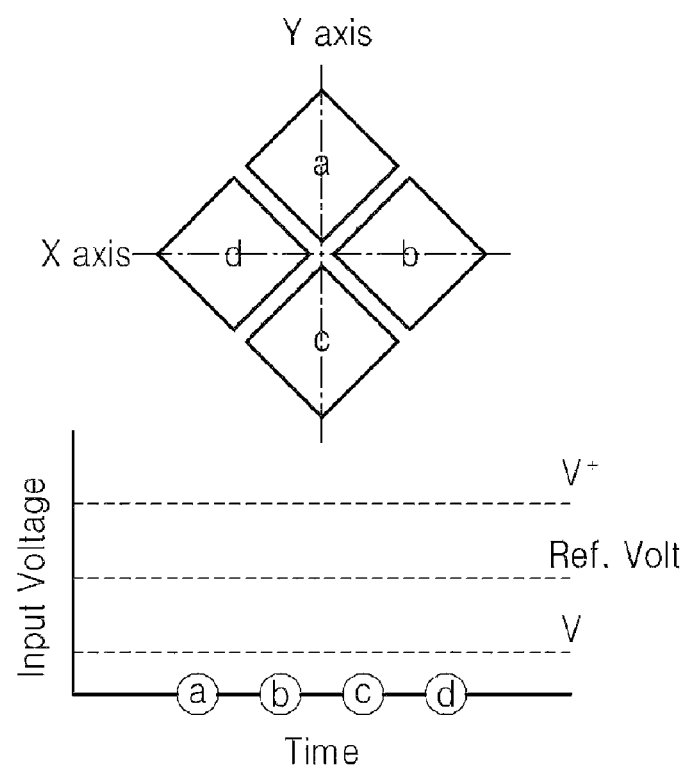

A method of operating the actuator will now be in more detail described, with reference to FIGS. 5A-5D. Referring to FIG. 5A, no voltage is applied to the first through fourth piezoelectric cells 10a-10d. In this regard, a, b, c, and d denote voltages applied to the first through fourth piezoelectric cells 10a-10d, respectively.

Figure 5B:
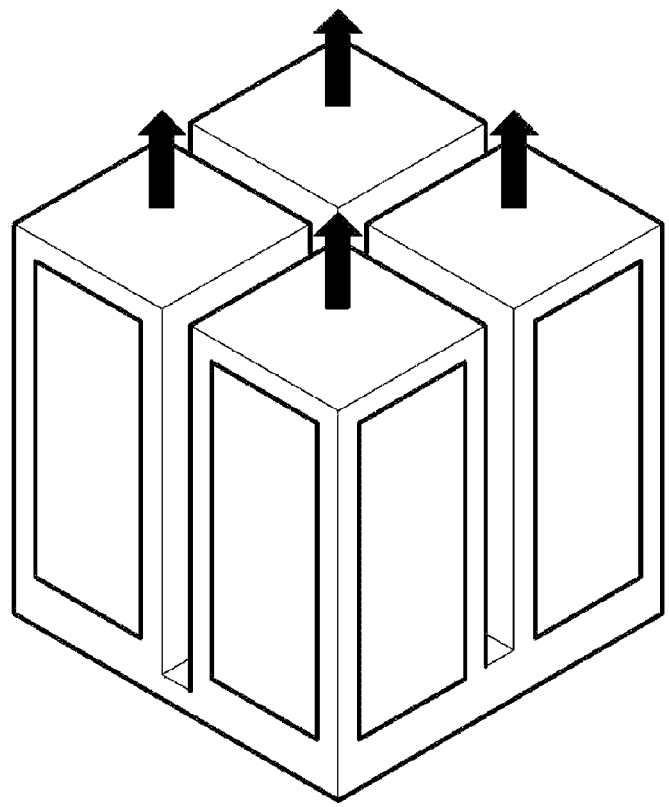
Figure 5B:
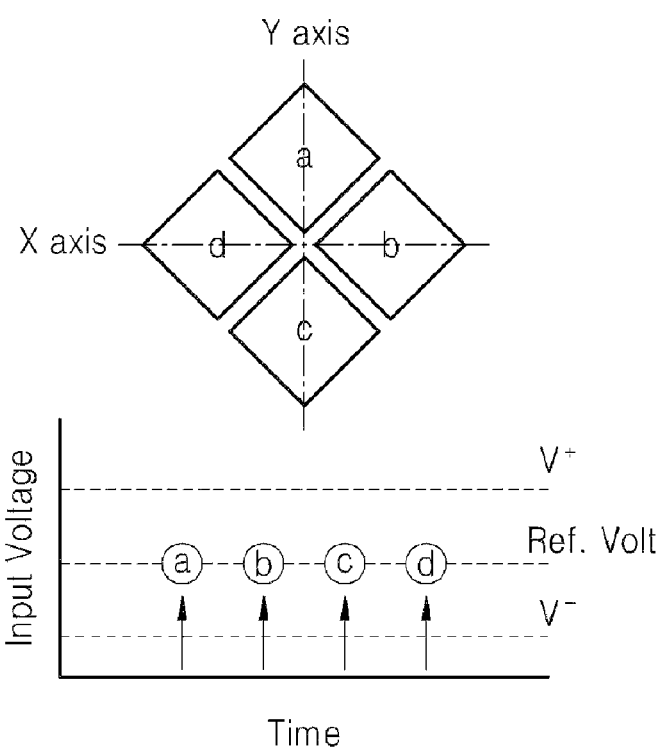

Referring to FIG. 5B, the length of the first through fourth piezoelectric cells 10a-10d is increased by applying reference voltage RefVolt to each of the first through fourth piezoelectric cells 10a-10d. In order to balance the lengths of the first through fourth piezoelectric cells 10a-10d, a feedback signal is formed, by reflecting light from photo diodes off of the mirror 50.

Figure 5C:
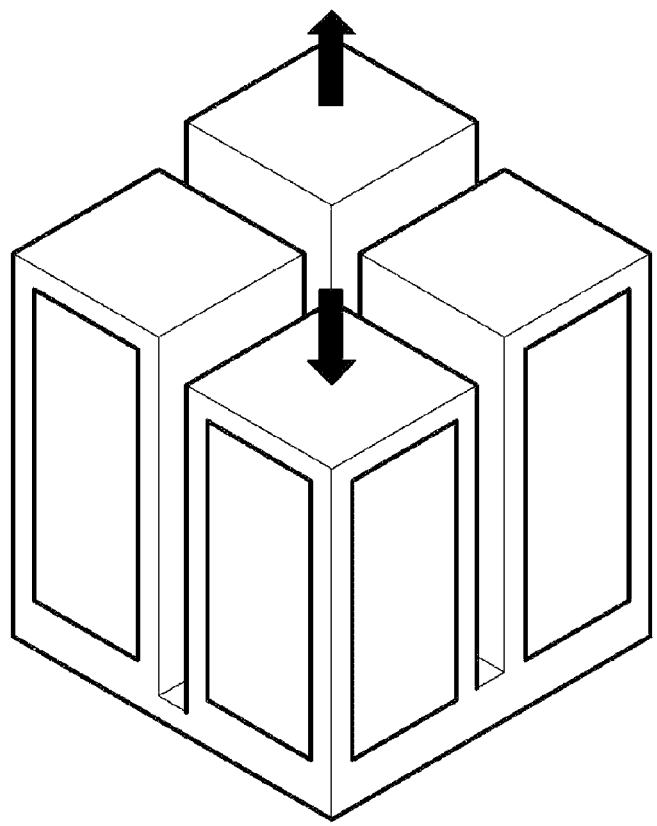
Figure 5C:
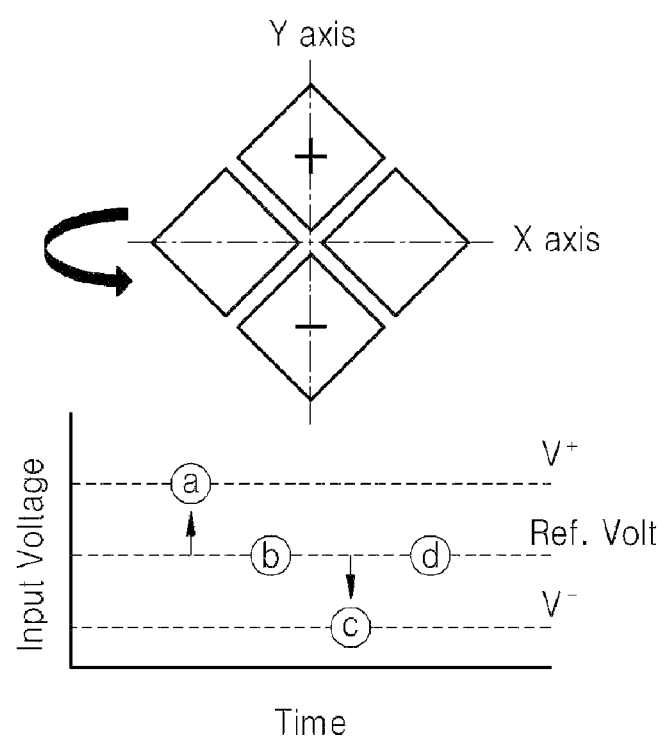

Referring to FIG. 5C, a positive voltage is applied to the first piezoelectric cell 10a, and a negative voltage is applied to the third piezoelectric cell 10c. The length of the first piezoelectric cell 10a is increased, and the length of the third piezoelectric cell 10c is reduced. This results in the mirror 50 being moved by the second and fourth piezoelectric cells 10b and 10d, around the X axis.

Figure 5D:
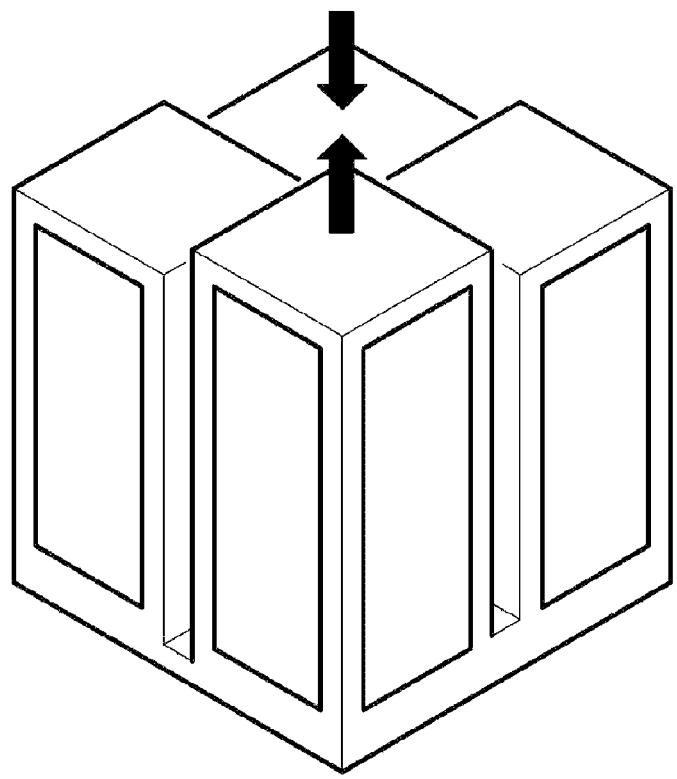
Figure 5D:
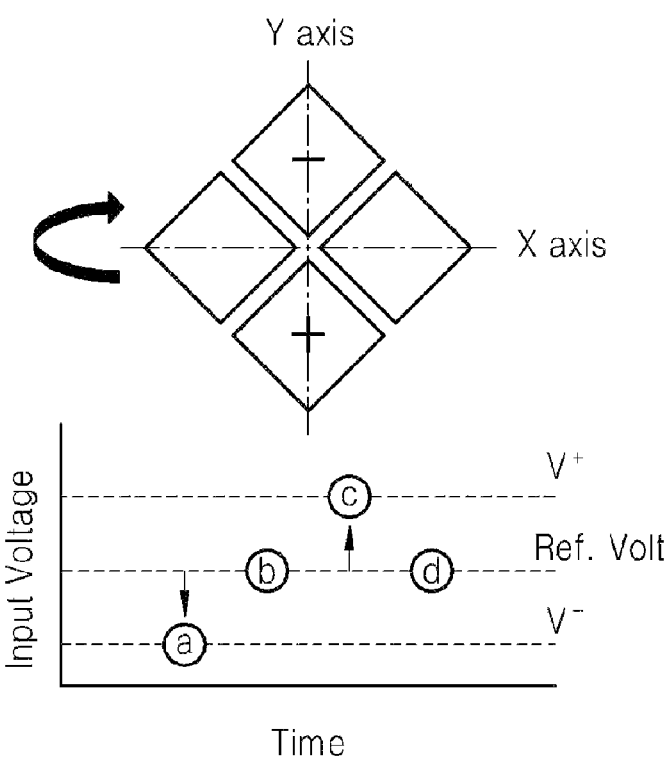

Referring to FIG. 5D, a negative voltage is applied to the first piezoelectric cell 10a, and a positive cell is applied to the third piezoelectric cell 10c. The length of the first piezoelectric cell 10a is reduced, and the length of the third piezoelectric cell 10c is increased, so that the mirror 50 is rotated in an opposite direction around the X axis, as shown in FIG. 5C. Although in FIGS. 5C and 5D the mirror 50 is rotated around the X axis, by applying voltages to the first piezoelectric cell 10a and the third piezoelectric cell 10c, the mirror 50 may be rotated around the Y axis, by applying voltages to the second piezoelectric cell 10b and the fourth piezoelectric cell 10d.

When the lengths of the first through fourth piezoelectric cells 10*a*-10*d* are changed, the support members 20*a*-20*d*, which are mounted on the first through fourth piezoelectric cells 10*a*-10*d*, move accordingly, to manipulate the hinge member 30. According to the operation of the hinge member 30, the mirror 50, which is supported by the post 40, rotates around the X axis and/or the Y axis. Stress generated by the twisting of hinge member 30 is dispersed in more places than if a simple hinge member, comprising a bar that lacks a curved portion, is used. Therefore, aspects of the present invention reduce a maximum stress value of the hinge member 30, allowing a large tilt angle to be obtained.

A bending point of the hinge member 30 is disposed closer to the center thereof, than a bending point of a conventional simple hinge member. The closer the bending point of the hinge member 30 is to the center, the higher the range of a tilting angle of the hinge member 30. This allows for a larger range of rotation for the hinge member 30, and thus, increases the operation freedom of the mirror 50.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An actuator to drive a mirror, the actuator comprising:
 piezoelectric cells;
 support members respectively mounted on the piezoelectric cells;
 a hinge member comprising:
  a bar disposed parallel to a rotation axis of the mirror; and
  a curved portion extending from the bar; and
 a post mounted on the hinge member, the post being configured to support the mirror.

2. The actuator of claim 1, wherein:
 the hinge member comprises:
  first plates coupled to the support members; and
  a second plate configured to support the post; and
 the bar and the curved portion are disposed between the first plates and the second plate.

3. The actuator of claim 1, wherein the curved portion comprises:
 a first part disposed parallel to the rotation axis of the mirror; and
 a second part disposed perpendicular to rotation axis of the mirror.

4. The actuator of claim 1, wherein the piezoelectric cells are connected to one another at a bottom surface thereof.

5. The actuator of claim 1, further comprising connectors disposed between adjacent ones of the support members.

6. The actuator of claim 2, wherein the support members comprise grooves configured to support the first plates.

7. The actuator of claim 1, wherein the hinge member is thinner than the support members.

8. The actuator of claim 1, wherein a space is formed between the support members, to accommodate movements of the hinge member.

9. An actuator to drive a mirror, the actuator comprising:
 piezoelectric cells;
 a support mounted on the piezoelectric cells;
 a hinge mounted on the support, the hinge comprising:
  bars disposed parallel to rotation axes of the mirror; and
  curved portions extending from the bars; and
 a post mounted between the hinge and the mirror.

10. The actuator of claim 9, wherein the support comprises: support members that are each mounted on a respective one of the piezoelectric cells; and connectors configured to flexibly connect adjacent ones of the support members.

11. The actuator of claim 10, wherein:
 the hinge comprises plates that are each connected to a respective one of the bars; and
 each support member comprises a groove to support a respective one of the plates.

12. The actuator of claim 10, wherein each support member comprises a protrusion that extends from a side thereof, to prevent the mirror from contacting the respective piezoelectric cell.

13. The actuator of claim 10, wherein:
 the hinge comprises a central plate connected to the curved portions and the post; and
 the support members define a central space to accommodate the central plate.

14. The actuator of claim 1, wherein the actuator is configured to be used for a holographic information storing apparatus.

15. The actuator of claim 9, wherein the actuator is configured to be used for a holographic information storing apparatus.

* * * * *